US006915656B2

(12) United States Patent
Ratliff

(10) Patent No.: US 6,915,656 B2
(45) Date of Patent: Jul. 12, 2005

(54) HEAT PUMP SYSTEM

(75) Inventor: Frank W. Ratliff, Payson, AZ (US)

(73) Assignee: ECO Technology Solutions, LLC, Leesburg, VA (US)

( * ) Notice: Subject to any disclaimer, the term of this patent is extended or adjusted under 35 U.S.C. 154(b) by 0 days.

(21) Appl. No.: 10/617,693

(22) Filed: Jul. 14, 2003

(65) Prior Publication Data

US 2005/0011214 A1 Jan. 20, 2005

(51) Int. Cl.$^7$ .............................. F25B 13/00; F25B 1/00
(52) U.S. Cl. .................... 62/324.6; 62/324.1; 62/238.7; 62/160
(58) Field of Search ............................. 62/324.1, 324.6, 62/498, 238, 235.1, 238.7, 510, 524, 525, 159, 160

(56) References Cited

U.S. PATENT DOCUMENTS

| 2,411,347 A | 11/1946 | Trumpler |
| 2,637,981 A | 5/1953 | Russell |
| 2,986,907 A | 6/1961 | Hoop |
| 3,411,538 A | 11/1968 | Gruner et al. |
| 3,823,573 A | 7/1974 | Cassady |
| 3,861,168 A | 1/1975 | Goldsberry |
| 4,018,581 A | 4/1977 | Ruff et al. |
| 4,080,801 A | 3/1978 | Post |
| 4,226,091 A | 10/1980 | Nowacki |
| 4,226,606 A | 10/1980 | Yaeger et al. |
| 4,250,715 A | 2/1981 | Ratliff |
| 4,266,404 A | 5/1981 | ElDifrawi |
| 4,383,418 A | 5/1983 | Holzer |
| RE31,281 E | 6/1983 | Swenson et al. |
| 4,537,037 A | 8/1985 | Clark, Jr. |
| 4,580,414 A | 4/1986 | Engelhard |
| 4,617,801 A | 10/1986 | Clark, Jr. |
| 4,727,727 A | 3/1988 | Reedy |
| 4,779,427 A | 10/1988 | Rowley et al. |
| 4,793,153 A | 12/1988 | Hembree et al. |
| 4,823,560 A | 4/1989 | Rowley et al. |
| 4,918,937 A * | 4/1990 | Fineblum ..................... 62/175 |
| 5,336,059 A | 8/1994 | Rowley |
| 5,761,921 A | 6/1998 | Hori et al. |
| 6,094,926 A | 8/2000 | Nakayama et al. |
| 6,164,331 A | 12/2000 | Sugita et al. |
| 6,418,745 B1 * | 7/2002 | Ratliff ....................... 62/324.6 |
| 6,581,384 B1 | 6/2003 | Benson |

FOREIGN PATENT DOCUMENTS

| DE | 196 13 220 A1 | 9/1999 |
| FR | 2 457 468 | 12/1980 |
| JP | 57-122109 | 7/1982 |
| JP | 61-96370 | 5/1986 |

OTHER PUBLICATIONS

International Search Report for Information Application No. PCT/US2004/020664, Nov. 26, 2004.
Written Opinion of the International Searching Authority, Nov. 26, 2004.

* cited by examiner

Primary Examiner—Chen Wen Jiang
(74) Attorney, Agent, or Firm—Finnegan, Henderson, Farabow, Garrett & Dunner, LLP

(57) ABSTRACT

A method and system for heating a space includes circulating refrigerant in a closed loop system having a first heat exchanger and a second heat exchanger. The circulating step includes pressurizing liquid refrigerant to a first pressure and heating the liquid refrigerant in a third heat exchanger to form a refrigerant vapor. The method further includes compressing refrigerant by a compressor to a second pressure, wherein the compressor is at least partially driven by refrigerant vapor received from the third heat exchanger, and supplying one of the first and second heat exchangers with refrigerant from the compressor. The method further includes supplying refrigerant from the other of the first and second heat exchangers to the compressor and selectively supercharging the refrigerant supplied to the compressor from the other of the first and second heat exchangers.

32 Claims, 7 Drawing Sheets

HEAT PUMP SYSTEM

FIELD OF THE INVENTION

The present invention relates to a new and improved heat pump system and method of cooling or heating a space. More particularly, the present invention relates to a method and apparatus for driving and controlling a heat pump system.

BACKGROUND

High energy costs and environmental concerns over the generation of pollution require more energy efficient mechanisms for heating and cooling interior spaces. Utilizing renewable energy resources and, in some cases, waste heat from any number of sources improves energy efficiency. Mechanisms that use energy must be easily adapted to a number of different energy sources without the need for expensive or customized adaptors.

The interior spaces that require heating and cooling are not limited to living and working environments, but also extend to spaces involved in transportation for humans and perishable commodities. The method of providing heating and cooling must be economical, efficient to manufacture, and inexpensive to maintain in order to be readily accessible for any number of applications in everyday life.

The standard Carnot reversible heat pump cycle, which uses an expansion valve for expanding the refrigerant fluid and a mechanical compressor for the compression of the refrigerant vapor, has been in use for a wide variety of applications. Essentially, in the cooling mode, such systems pass saturated liquid refrigerant through an expansion valve to lower the refrigerant's pressure, and therefore the saturation temperature of the refrigerant correspondingly falls, and the cooled refrigerant is then directed to an evaporator where heat is absorbed from the atmosphere, thereby cooling the environmental space (or some other medium where cooling is desired).

This cycle may be reversible, thus permitting the same system to operate as a heat pump. To provide heating of a space, energy is added to the system by a compressor and ambient air. Most of the prior art devices that accomplish this task are known to consume large amounts of energy (usually electrical energy), and are inefficient in both the cooling and heating modes.

For example, FIG. 1 depicts a conventional heat pump device. As illustrated, this conventional heat pump system requires a common compressor unit to be driven by direct electric motor energy input, or power transferred from a rotating shaft, as in a vehicle system.

The benefits of heat powered heat pump devices designed for use in the home or office are well known. An example of a conventional heat powered heat pump is disclosed in U.S. Pat. No. 4,918,937.

U.S. Patent No. 4,918,937 provides an air conditioning system for an automobile that uses both a mechanical compressor and a refrigerant pump to motivate refrigerant through the system. The '937 patent discloses an engine-driven mechanical compressor that compresses the vaporized refrigerant until the pressure of refrigerant flowing from the refrigerant pump through a heat exchanger and an ejector is high enough to sufficiently pressurize the vaporized refrigerant. Once the required pressure level is met, the mechanical compressor is disengaged and the refrigerant pump, heat exchanger and ejector motivate the refrigerant through the system. One drawback of the '937 patent is that the system requires a mechanical compressor to compress the vaporized refrigerant being sent to the heat exchanger.

The present invention provides a heat pump system that avoids some or all of the aforesaid shortcomings in the prior art.

SUMMARY OF THE INVENTION

In accordance with one aspect of the invention, a method of heating a space includes circulating refrigerant in a closed loop system including a first heat exchanger and a second heat exchanger. The circulating step includes pressurizing liquid refrigerant to a first pressure, heating the liquid refrigerant in a third heat exchanger to form a refrigerant vapor, compressing refrigerant by a compressor to a second pressure, wherein the compressor is at least partially driven by refrigerant vapor received from the third heat exchanger, and supplying one of the first and second heat exchangers with refrigerant from the compressor.

According to another aspect of the present invention, a method of heating a space including circulating refrigerant in a closed loop system including a first heat exchanger and a second heat exchanger. The circulating step includes pressurizing liquid refrigerant to a first pressure, heating the liquid refrigerant in a third heat exchanger to form a refrigerant vapor. The method further includes compressing refrigerant by a compressor to a second pressure, wherein the compressor is at least partially driven by refrigerant vapor received from the third heat exchanger, and supplying one of the first and second heat exchangers with refrigerant from the compressor. Further steps include supplying refrigerant from the other of the first and second heat exchangers to the compressor, and selectively supercharging the refrigerant supplied to the compressor from the other of the first and second heat exchangers.

According to yet another aspect of the present invention, a heat pump system includes a closed loop circuit having a liquid pump and a first heat exchanger located downstream of the liquid pump. The system further includes a refrigerant compressor driven by refrigerant flowing from the liquid pump through the first heat exchanger, a second heat exchanger fluidly coupled to the refrigerant compressor; and a third heat exchanger fluidly coupled to the refrigerant compressor.

DETAILED DESCRIPTION

Reference will now be made in detail to the drawings. Wherever possible, the same reference numbers will be used to refer to the same or like parts.

Figure 1:
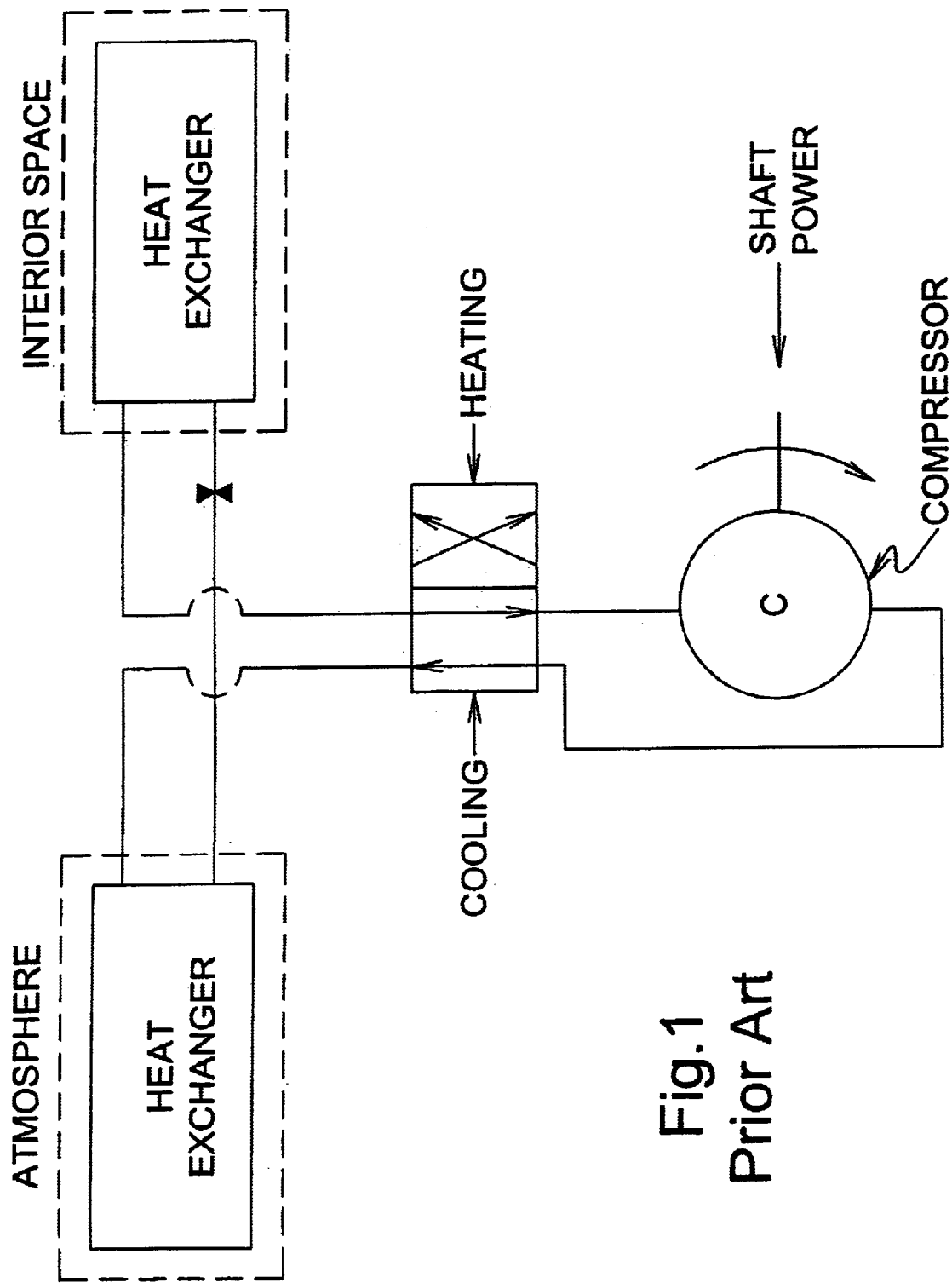
FIG. 1 is a schematic representation of a conventional prior art heat pump device.
Figure 2:
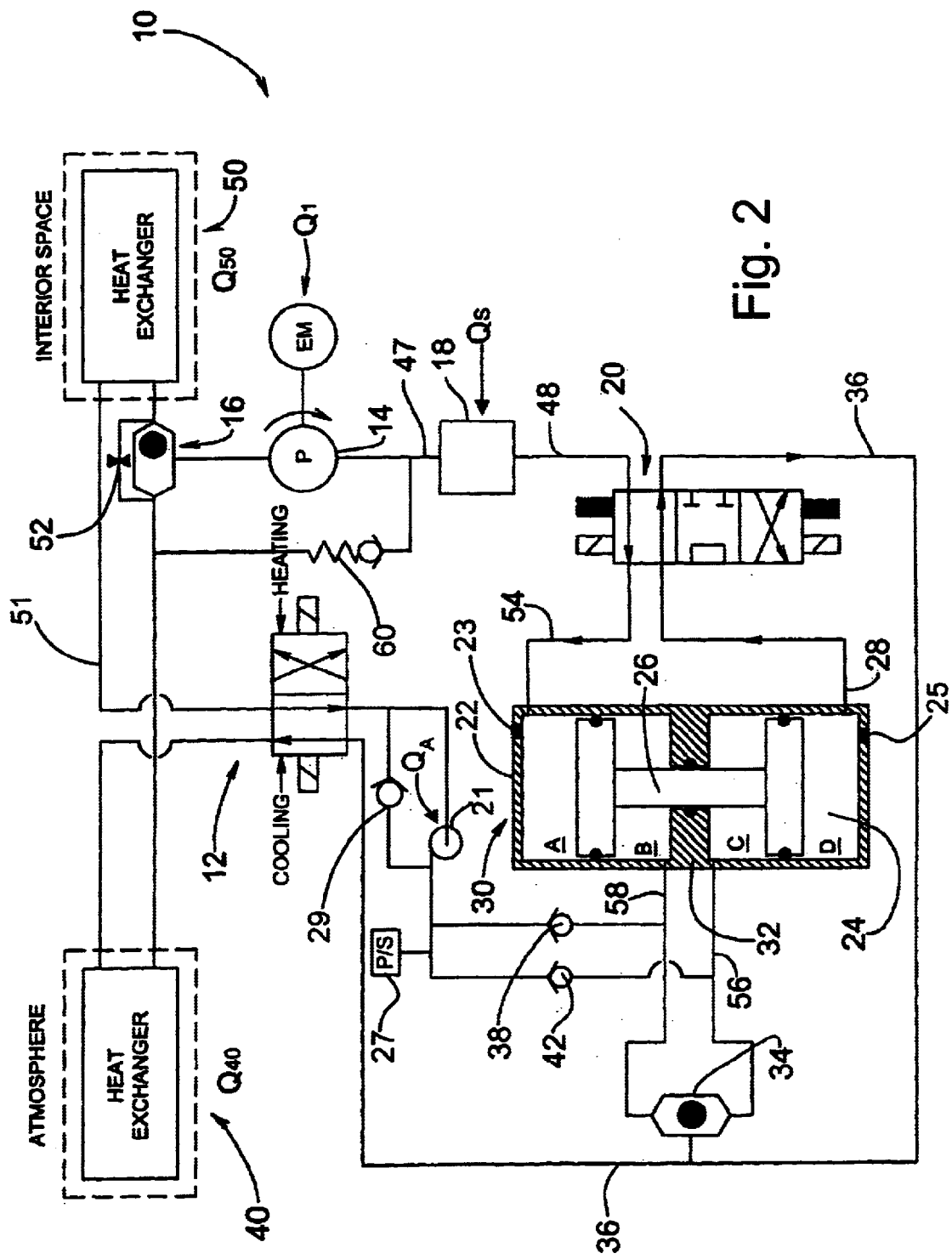
FIG. 2 is a schematic representation of the novel heat powered heat pump system constructed in accordance with the present disclosure.

FIG. 2 depicts a heat powered heat pump system 10 in accordance with the present disclosure. As shown, the heat pump system 10 can cool an interior space, and by reversing the operation cycle, can also be used to heat an interior space. If the heat pump system 10 is used only for cooling or only for heating, certain components, such as a cooling/heating switch and a valve assembly can be altogether eliminated from the heat pump system 10. Further, heat pump system 10 is readily scalable, making it applicable to cooling and heating uses in large spaces as well as smaller volumes. For example, heat pump system 10 can be readily carried on board vehicles with their associated space limitations.

The heat pump system 10 will now be described by way of its operation. To initiate operation of heat pump system 10, an electric motor driven pump unit 14 receives liquid refrigerant from valve 16 and pressurizes and delivers liquid refrigerant to heat exchanger 18. The energy required to drive pump unit 14 is labeled $Q_1$. Heat exchanger 18 receives the pressurized liquid refrigerant and adds available heat from an energy source $Q_s$, discussed in greater detail below, which converts the liquid to a high pressure vapor. The high pressure vapor is then supplied to a switching valve 20 along high pressure vapor line 48. It is noted that pump unit 14 can be any device that acts to pressurize liquid refrigerant, and pump unit 14 may operate continuously during the operation of heat pump system 10.

Heat pump system 10 further includes a relief/check valve assembly 60 interposed between heat exchanger 18 and the pump 14 for controlling the pressure of liquid traveling to the heat exchanger 18.

In the position shown in FIG. 2, switching valve 20 of heat pump system 10 directs high pressure vapor in line 48 to line 54 which forms an inlet to chamber A of a four chamber compressor unit 30. Switching valve 20 also exposes chamber C of compressor unit 30 to output line 36 by way of line 28.

Compressor unit 30 may include a cylinder housing 22 and a double piston assembly 24 capable of reciprocation within the cylinder housing 22. The two pistons of piston assembly 24 are connected by a piston rod 26. The cylinder housing 22 includes a divider 32 at its midpoint having an opening for receiving the piston rod 26. Housing 22 and piston assembly 24 together form four separate chambers of compressor unit 30, and these compressor chambers are designated chambers A, B, C, and D. Chambers A and D will be referred to as external chambers, and chambers B and C will be referred to as internal chambers.

When high pressure vapor is conducted through switching valve 20 into chamber A (and chamber D is exposed through switching valve 20 to output line 36), the piston assembly 24 will move to expand chamber A (a downward motion as shown in FIG. 2). This motion of the piston assembly 24 will cause the volume of chamber B to decrease, having a resulting compression effect, while simultaneously causing the volume of chamber C to increase, having a resulting suction effect. Additionally, this motion of the piston assembly 24 expanding chamber A will cause vaporized refrigerant located in chamber D from a previous cycle to flow out line 28 through switching valve 20 and to output line 36.

The compression of the vapor in chamber B due to the movement of piston assembly 24 causes compressed vapor to be delivered through line 58 to valve 34, and to output line 36. Thus, pressurized refrigerant vapor is supplied to output line 36 from both chamber B and chamber D. The pressurized refrigerant in output line 36 then flows through a cooling/heating switching valve 12 and on to a heat exchanger 40. Heat exchanger 40, a condenser when cooling/heating switching valve 12 is in the cooling position (shown in FIG. 2), is exposed to the atmosphere and the pressurized refrigerant releases and transfers heat to the atmosphere. This heat transfer transforms the pressurized vapor back to a liquid state (condensation) before returning to either heat exchanger 50 via expansion valve 52 or pump unit 14 via valve assembly 16.

Heat exchanger 50 receives liquid refrigerant from heat exchanger 40 through expansion valve 52, located on valve assembly 16. It is noted that expansion valve 52 may include any type of structure that lowers the pressure of the flowing liquid refrigerant (e.g., a flow orifice, a capillary tube, a sophisticated modulating device that adjusts for dynamic operating loads). The liquid refrigerant in heat exchanger 50 is then vaporized due to exposure with available heat from the interior space. The transfer of heat from the interior space to the liquid refrigerant in heat exchanger 50 acts to cool the interior space.

While the heat exchanger 50 receives liquid refrigerant from heat exchanger 40, the movement of piston assembly 24 causes chamber C to draw vaporized refrigerant in from a heat exchanger 50 via line 51 and line 56. The vaporized refrigerant flowing through line 51 travels though cooling/heating switching valve 12, and, as will be described in more detail below, through either a supercharger 21 or check valve 29. The refrigerant will also pass through check valve 42 as it travels to line 56 and into chamber C.

Vaporized refrigerant flowing to chamber C will flow through supercharger 21 when the supercharger 21 is operating. Otherwise, the vaporized refrigerant will flow through check valve 29 on its way to chamber C. A pressure switch 27 may be included in heat pump system 10 to control the actuation of supercharger 21 based on the outlet pressure of supercharger 21. When supercharger 21 is operating, supercharger 21 pressurizes the vapor refrigerant flowing from heat exchanger 50 to chamber C. Supercharger 21 may continue to pressurize refrigerant toward chamber C even when chamber C is at its maximum volume. During operation of compressor unit 30, it is understood that the pressure of refrigerant in output line 36 is higher than the discharge pressure of supercharger 21, thus preventing the flow of refrigerant vapor from supercharger 21 to output line 36.

The flow rate of the supercharger 21 can be selected or adjusted so that it equals the rate required to fill chamber C as chamber C expands. With such a matched flow rate, the power required to operate the supercharger 21 is relatively low when chamber C is expanding. Once chamber C stops expanding—corresponding to the piston assembly 24 reaching a maximum position—the supercharger 21 may continue to supercharge chamber C. During this supercharge period, the pressure in chamber C increases, along with the power $Q_A$ required to operate the supercharger 21. Accordingly, the supercharge period is the only time that the supercharger 21 demands any substantial power.

In the operation described above, supercharger 21 acts to supercharge chamber C and supplement the energy received by the heat pump system 10. Thus, supercharger 21 acts as a backup energy source that is only used when the system demands call for it. Thus, supercharger 21 is only required for relatively short periods of time to provide supercharging of chamber C, and therefore requires only a relatively small amount of "purchased external" energy. During low heat transfer requirements of the system, the supercharger is not required, and the amount of "purchased external" energy is zero.

It is understood that supercharger 21 may operate as a typical mechanical compressor when there is no waste heat to power $Q_s$ or when the operating load of the heat pump system 10 is relatively low and the system 10 does not require operation of compressor unit 30. For example, if $Q_s$ receives its power from solar energy during the day, at night, there will be a relatively small amount of power supplied to heat exchanger 18. Further, there may also be a relatively low demand for cooling from the system 10. In this example, the supercharger 21 may operate as a compressor to carry the low system load. In this operation, supercharger 21 moves refrigerant through check valves 38 and 42, valve 34, output line 36 to heat exchangers 40, 50 and back to supercharger 21 through line 51.

The above described operation of heat pump system 10 has detailed the movement of the piston assembly 24 to expand chamber A. When this operation is complete, switching valve 20 may be switched such that high pressure vapor is now delivered to chamber D of compressor unit 30, and simultaneously chamber A is exposed to output line 36 thru switching valve 20. This action causes the piston assembly 24 to move to expand chamber D (an upward motion as shown in FIG. 2). This movement of piston assembly 24 also causes chamber C to compress vapor and deliver vapor through line 56 to valve 34. Thus, output line 36 now receives high pressure vapor from both chamber C and chamber A. This high pressure vapor in output line 36 then travels through cooling/heating switching valve 12, and then on to heat exchanger 40.

The motion of the piston assembly 24 to expand chamber D further causes chamber B of the compressor unit 30 to increase in volume. This movement of piston assembly 24 draws refrigerant vapor from heat exchanger 50 in the same manner described above with respect to the expansion of chamber C.

The movement of piston assembly 24 in the direction to expand chamber D produces the same effect at the heat exchangers 40 and 50 as the motion to expand chamber A. Namely, heat is rejected at the heat exchanger 40 (condenser), and at the same time heat is absorbed at heat exchanger 50 (evaporator).

The switching time period on switching valve 20 is variable to adjust the heat transfer rate of the system. Control of switching valve 20 may be obtained by a conventional control system, such as the control circuit 70 and 71 detailed below. In operation, when the system 10 is functioning with a short switching time period for switching valve 20, this causes faster cycling rates of the piston assembly 24 of compressor unit 30, and therefore, a higher heat transfer rate at the respective heat exchangers 40 and 50. When no heat transfer is required of heat exchangers 40 and 50, cycling of switching valve 20 is stopped and compressor unit 30 halts.

Figure 3:
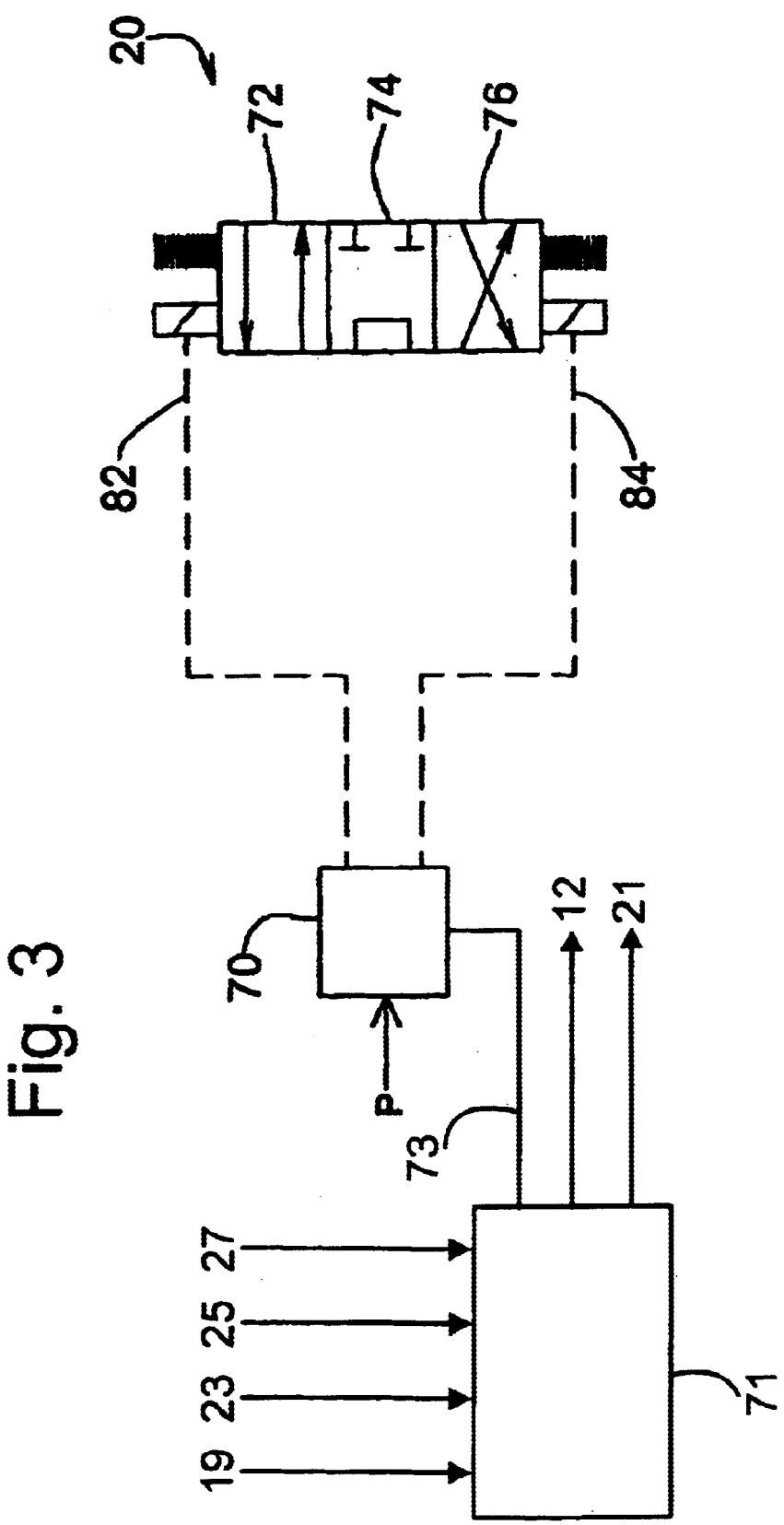
FIG. 3 is a schematic representation of a switching valve controller circuit for the heat pump system constructed in accordance with the present disclosure.

FIG. 3 shows the switching valve 20 wired to a controlling circuit 70. Switching valve 20 is a conventional three-position, electrically actuated, spring centered, four-way fluid diverter valve. Switching valve 20 has three positions, namely, a straight diversion position 72, a center "off" position 74, and a crossed diversion position 76. The center position 74 of switching valve 20 has the configuration of "blocked flow" on the fluid input and return ports of the valve 20, and the "working ports" supplying the compressor unit 30 are in fluid communication with the selected chambers of the compressor unit 30.

The cycling and frequency of the cycling between positions 72, 74, and 76 of switching valve 20 is controlled by an electrical control circuit 70. Electrical power, designated P, is switched and alternately supplied to output wires 82 and 84. The cycling of the electrical signals traveling to switching valve 20 from the control circuit 70 via output wires 82 and 84 is regulated by a control signal 73 acting on control circuit 70.

As depicted in FIG. 3, an input/output device 71 may receive signals from a thermostat 19, the piston assembly position sensors 23 and 25, and pressure switch 27. The device 71 may then provide the control signal 73 to electrical control circuit 70, thus regulating the frequency at which power is applied to output wires 82 and 84. Further, the device 71 may also provide a signal to the supercharger 21 and switching valve 20, thus regulating the operation of both the supercharger 21 and switching valve 20.

The circuit controller 70 may include a delay in timing, or "dead time," after the signal to output wire 82 is removed and before the signal to output wire 84 is applied, and conversely, when a signal is removed from output wire 84 and before a signal is applied to output wire 82. This "dead time" feature allows switching valve 20 to remain in the center position for a predetermined amount of time, the advantages of which are described in greater detail below.

Figure 4:
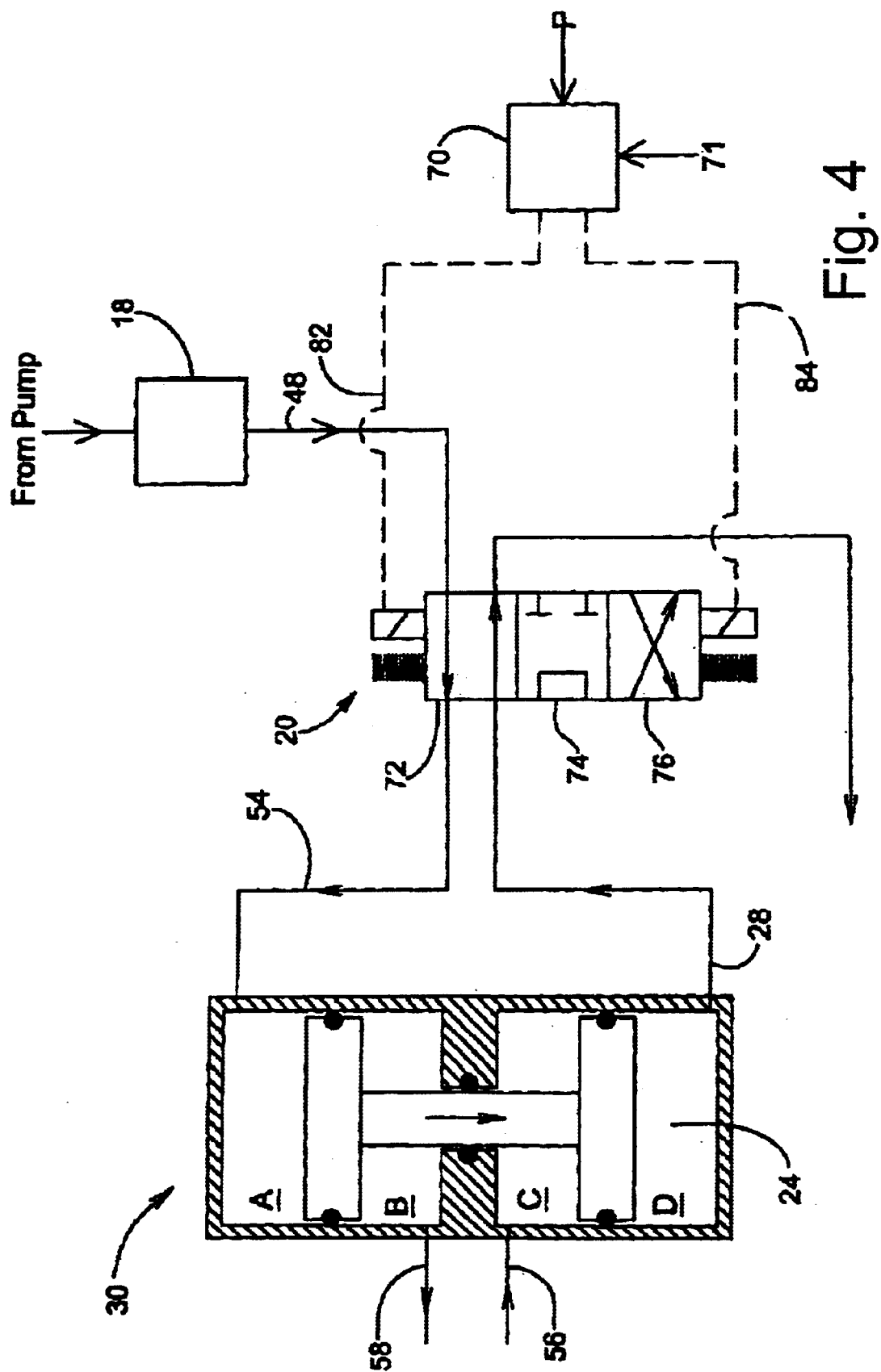
FIG. 4 is an enlarged partial schematic representation of the switching valve and piston assembly movement in accordance with the present disclosure.
Figure 5:
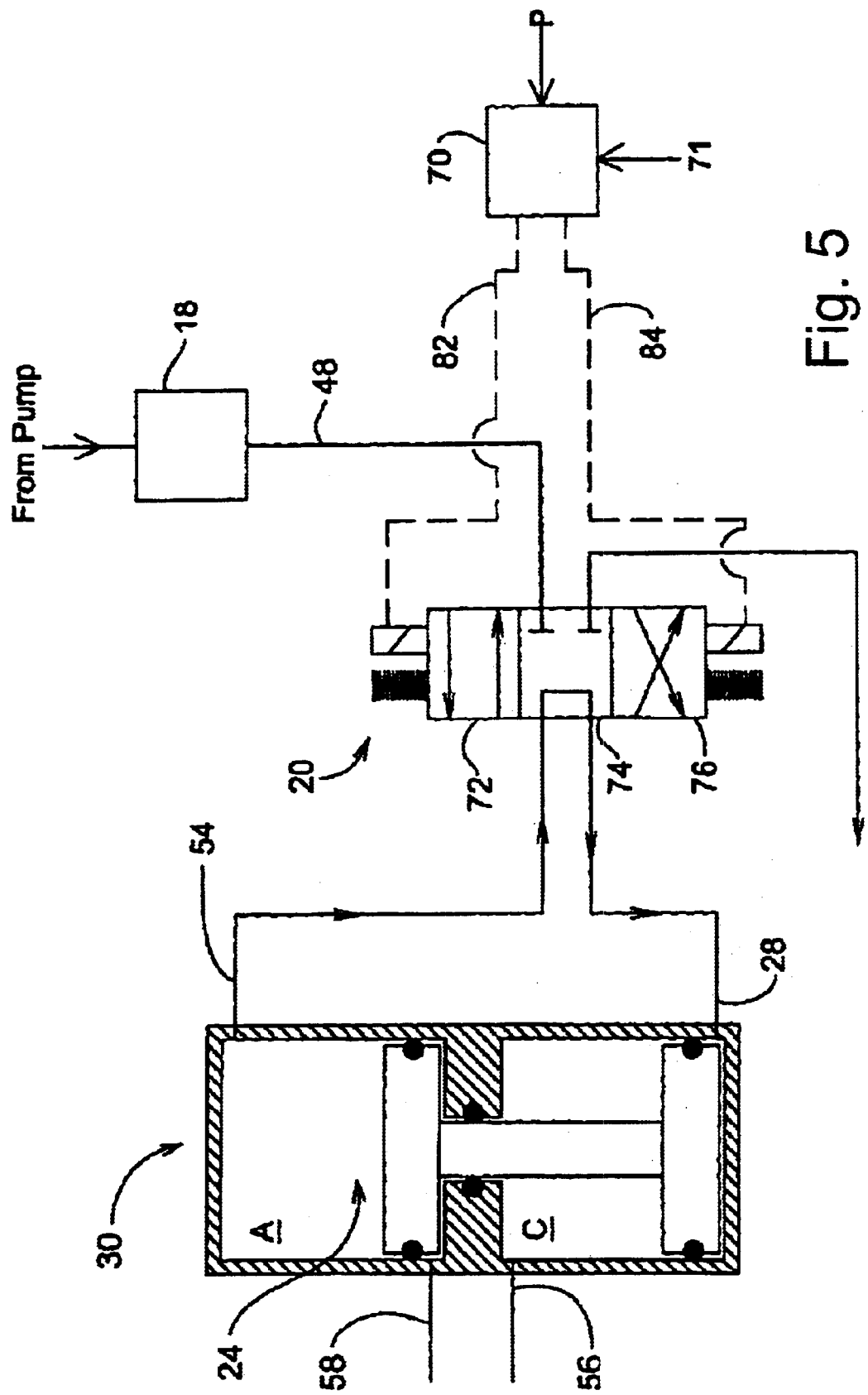
FIG. 5 is a further enlarged partial schematic representation of the switching valve and piston assembly movement in accordance with the present disclosure.
Figure 6:
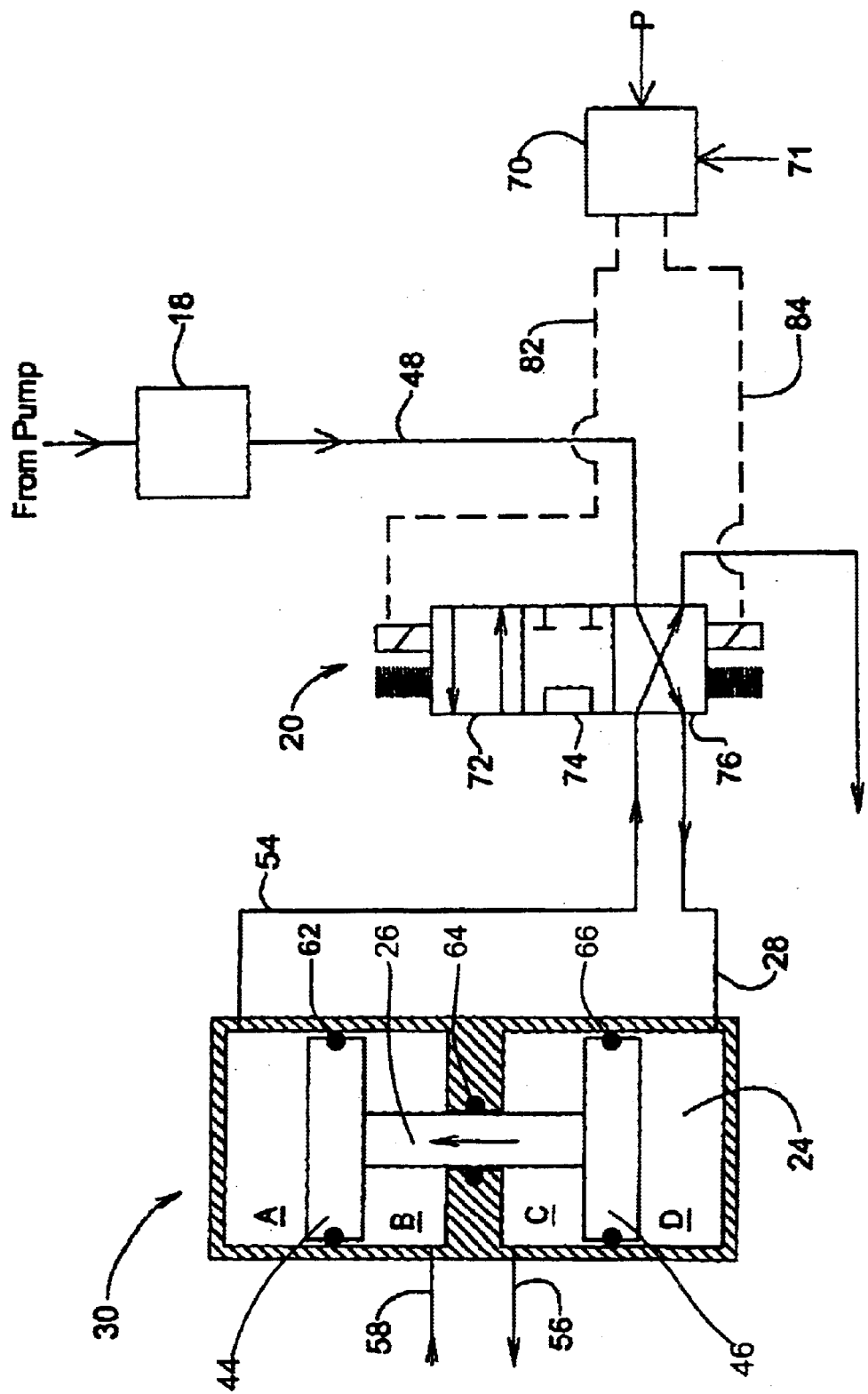
FIG. 6 is yet a further enlarged partial schematic representation of the switching valve and piston assembly movement in accordance with the present disclosure.

Referring now to FIGS. 4–6, there is shown in greater detail the three positions of switching valve 20, namely the dynamics of the heat pump system 10 during the cycling of switching valve 20 through each of the three positions of the switch.

Beginning with FIG. 4, switching valve 20 receives a signal from output wire 82 and consequently is in the straight open position 72. In this position 72, high pressure vapor is supplied to compressor unit chamber A and evacuated from chamber D along lines 54 and 28, respectively. This causes the piston assembly 24 to move downwardly (as shown), thereby exhausting vapor out of chamber D and chamber B, while simultaneously receiving vapor into chamber C by the movement action of the piston assembly 24.

FIG. 5 depicts the piston assembly 24 as having reached its maximum downward stroke. At this point, the electric signal along output wire 82 has been discontinued, and removed from switching valve 20 by circuit controller 70 and input/output device 71, thereby allowing switching valve 20 to move to its center position. Input/output device 71 receives signals from the piston position sensor devices 23 and 25 to facilitate the switching sequence of switching valve 20. This allows the pressurized vapor in compressor unit 30 chamber A to communicate through switching valve 20 and move into chamber D and pressurize chamber D. This sequence of events improves the operating efficiency of the overall system 10 since the vapor pressure in chamber A is not-completely exhausted to condenser 40 (not shown, see FIG. 2) through switching valve 20.

FIG. 6 shows the last cycle of piston movement in the heat powered heat pump system 10. Here, after a pre-determined time, the "dead time," circuit controller 70 applies an electrical current along output wire 84 to switching valve 20 that causes switching valve 20 to supply high pressure vapor to chamber D of compressor unit 30.

As a result, the piston assembly 24 moves to expand chamber D. When the piston assembly 24 reaches its maximum upward stroke, the cycle begins again.

Figure 7:
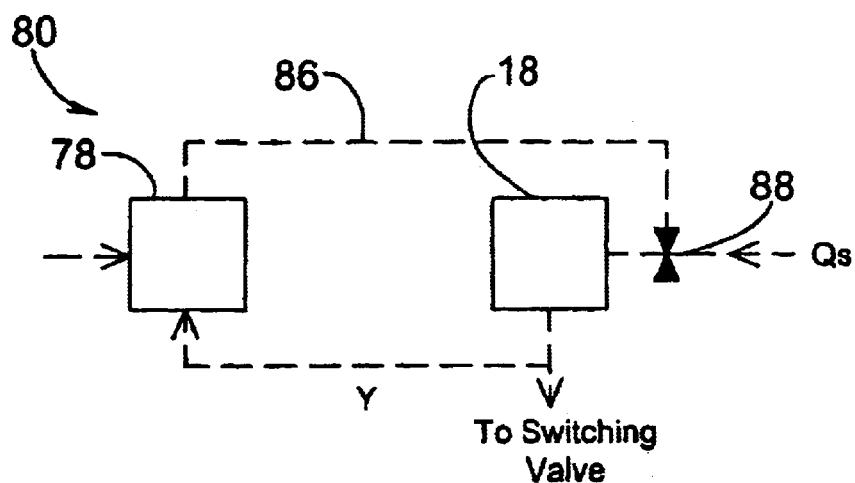
FIG. 7 is a schematic representation of a heat exchanger controller circuit for the heat pump system constructed in accordance with the present disclosure.

FIG. 7 shows an alternative embodiment of the present disclosure. In this embodiment, a power control system 80 controls heat pump system 10. Control system 80 enables the amount of power $Q_S$ supplied to heat exchanger 18 to be controlled and limited depending upon the rejection temperature of the acting condenser unit (40 or 50) within the system.

As will be described in more detail below, heat exchangers 40 and 50 can act as a condenser or an evaporator depending upon the position of cooling/heating switching valve 12. Therefore, the power $Q_S$ supplied to heat exchanger 18 is proportional to the rejection power of the system's condenser heat exchanger at the time, whether it be heat exchanger 40 or heat exchanger 50. FIG. 7 depicts a power control system 80 that monitors the rejection temperature of the "condenser" heat exchanger, designated X, and monitors the temperature, designated Y, of the high-pressure vapor leaving heat exchanger 18. Depending upon the physical thermodynamic characteristics of the refrigerant fluid used in the system, a circuit controller 78 maintains a differential relationship between temperature X and temperature Y by supplying a signal along output wire 86 to modulate the amount of power supplied to heat exchanger 18. Signals traveling along output 86 could energize a flow valve 88 when the system is powered by hot fluid (such as solar powered hot water generation). Alternatively, signals traveling along output 86 could energize a power relay (not shown) that would be located directly in substitution of flow valve 88, in the case where electrical power is employed to power an electrical heating element to heat the refrigerant in heat exchanger 18.

Figure 8:
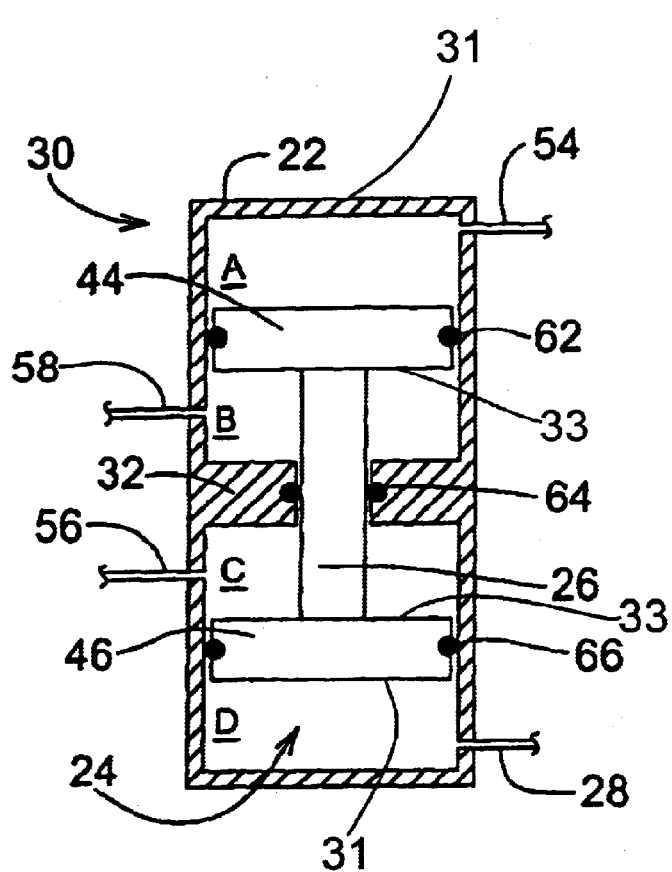
FIG. 8 is a cross-sectional side elevational view of the compressor unit component of the heat powered heat pump system constructed in accordance with the present disclosure.

FIG. 8 shows an enlarged cross-sectional illustration of the compressor unit 30, including the presence and location of sealing elements 62, 64, and 66. These sealing elements 62, 64, and 66 represent the sliding seals within compressor unit 30. The sealing elements 62, 64, and 66 can be constructed from metallic materials, alloys, or elastomer sealing materials. The elastomer sealing material is chosen for compatibility with refrigerant fluids and the anticipated system operating temperature extremes. It is noted that sealing elements 62 and 66 act as piston rings being centrally located at the piston heads 44 and 46, respectfully. Sealing element 64, located in compressor housing 22 and divider 32, acts to seal the piston rod 26. Overall, the sealing elements 62, 64, and 66 act to insure that each compressor unit 30 chamber A, B, C, and D do not come into fluid communication with one another.

Additionally, FIG. 8 depicts the different cross-sectional surface areas of piston assembly 24. In particular, the internal chambers B and C have smaller surface areas 33 than the external chamber surface areas 31.

As previously mentioned above, heat pump system 10 may include a cooling/heating switching valve 12 that allows the system to switch between an interior cooling mode and an interior heating mode. This is accomplished by activating cooling/heating switching valve 12 to supply highly pressurized refrigerant vapor to one of the heat exchanger 40 or the heat exchanger 50.

As the system has been described, in the interior cooling mode, and if we denote heat or energy transfer as positive "+" when put into the system, and as negative "−" when energy is transferred out of the system, we can write an energy balance equation as follows (based on an ideal system with no energy losses):

$$Q_A+Q_1+Q_s+Q_{50}-Q_{40}=0$$

where
 $Q_A$=Supercharger
 $Q_1$=Pump Input Power
 $Q_S$=Energy From Heat Source
 $Q_{50}$=Interior Heat Transfer
 $Q_{40}$=Atmosphere Heat Transfer
or $$Q_A+Q_1+Q_s+Q_{50}=Q_{40}$$

Therefore, all heat/power is rejected to the atmosphere when the heat powered heat pump system 10 is in the cooling mode.

If the system is used to supply heat to the interior space, cooling/heating switching valve 12 is switched to the heating position, which in effect switches (reverses) the functions of the heat exchanger 40 and heat exchanger 50. Now, in this heating functioning mode, heat exchanger 40 has become an evaporator and heat exchanger 50 has become a condenser. The condenser function, to reject heat, is now in the interior space and will now heat the interior space. The heat exchanger functioning as an evaporator, here heat exchanger 40, is now located outside the interior space and has the ability to absorb heat from the atmosphere.

The energy balance equation now becomes (based on an ideal system with no energy losses):

$$Q_A+Q_1+Q_s+Q_{50}-Q_{40}=0$$

where
 $Q_A$=Supercharger
 $Q_1$=Pump Input Power
 $Q_S$=Energy From Heat Source
 $Q_{50}$=Interior Heat Transfer
 $Q_{40}$=Atmosphere Heat Transfer
or $$Q_A+Q_1+Q_s+Q_{50}=Q_{40}$$

Therefore, during the heating mode of the system, $Q_{50}$ (interior heat transfer) is equal to the total energy input to the system 10, including the large heat input $Q_{40}$, from the atmosphere. For example, when the system 10 is used to heat an electric car that is powered by fuel cells, $Q_1$ is consumed from the battery, $Q_s$ is provided by the waste heat from the fuel cells, and $Q_{40}$ is provided from the atmosphere. This results in a decreased consumption of battery power for the same amount of energy to heat the car's interior, adding up to less energy required to operate the system 10, and much greater efficiency overall. If there is insufficient waste heat to power $Q_s$, as during the beginning operation of the car, the battery may be used to provide the initial power for $Q_s$, and after sufficient waste heat from the fuel cells is generated, the battery will no longer provide power for $Q_s$.

Efficiency of the heat pump system 10 is greatly enhanced by the available heat input to heat exchanger 18. To illustrate this point, energy, in the form of heat, is applied to heat exchanger 18 in many forms. This available heat might be generated by direct electrical power from a power grid, photovoltaic cells, wind power generators, and fuel cell technology, including proton exchange membrane fuel cells, and fuel cells designed for electric car power plants, such as zinc pellet fuel cells. Alternatively, the heat passed on to the heat exchanger 18 may be derived from hot water sources. This hot water may have been generated using all of the above systems, or directly through the use of solar power hot water generation (e.g., direct exposure panels, etc.). All of these methods that provide generated heat and/or waste heat from mechanical heat creation (e.g., engine waste heat) are factors in the overall greater operating efficiency realized with the subject heat powered heat pump system 10. As used in this disclosure, waste heat includes any source of heat energy that is expelled from a device and would otherwise be emitted to the atmosphere.

As an alternative arrangement of heat pump system 10, high pressure refrigerant vapor from heat exchanger 18 could be alternatingly supplied to chambers B and C rather than chambers A and D of compressor unit 30. Accordingly, in this arrangement, chambers A and D would supply and receive refrigerant vapor from heat exchangers 40 and 50.

It should be understood, however, that even though these numerous characteristics and advantages of the invention that have been set forth in the foregoing description, together with details of the structure and function of the invention, the disclosure is illustrative only, and changes may be made in detail, especially in matters of shape, size, chemistry and arrangement of parts within the principal of the invention to the full extent indicated by the broad general meaning of the terms in which the appended claims are expressed.

What is claimed is:

1. A method of heating a space, comprising:
   circulating refrigerant in a closed loop system including a first heat exchanger and a second heat exchanger, the circulating step including
   pressurizing liquid refrigerant to a first pressure;
   heating the liquid refrigerant in a third heat exchanger to form a refrigerant vapor;
   compressing refrigerant by a compressor to a second pressure, wherein the compressor is at least partially driven by refrigerant vapor received from the third heat exchanger;
   supplying one of the first and second heat exchangers with refrigerant from the compressor; and
   selectively supercharging refrigerant prior to compression by the compressor.

2. The method of heating a space according to claim 1, wherein the step of selectively supercharging the refrigerant includes a supercharger that is controlled at least in part by a refrigerant pressure in the system at a location between the superchargers and the compressor.

3. The method of heating a space according to claim 2, further compressing the step of disabling the supercharger during low heat transfer requirements.

4. The method of heating a space according to claim 1, further comprising switching modes of operation of the system, wherein in a first mode of operation the first heat exchanger receives refrigerant from the compressor and in the second heat exchanger receives refrigerant from the compressor.

5. The method of heating a space according to claim 4, wherein the system includes a controllable valve adapted to alternate the operation of the system between the first mode and the second mode.

6. The method of heating a space according to claim 1, further comprising supplying waste heat to the third heat exchanger to heat the liquid refrigerant.

7. The method of heating a space according to claim 1, wherein the compressor includes a reciprocating piston member separating a drive chamber and a compression chamber, wherein the drive chamber receives refrigerant vapor from the third heat exchanger and the compression chamber supplies refrigerant to the first heat exchanger.

8. The method of heating a space according to claim 7, wherein the compressor further includes a suction chamber, the suction chamber receiving refrigerant from the second heat exchanger.

9. The method of heating a space according to claim 8, wherein the drive chamber is a first drive chamber and the compressor further includes a second drive chamber, the second drive chamber receiving refrigerant vapor from the third heat exchanger upon actuation of a controllable switching valve.

10. The method of heating a space according to claim 1, wherein the step of pressurizing liquid refrigerant to a first pressure includes pressurizing the liquid refrigerant with an electric motor driven pump.

11. The method of heating a space according to claim 1, wherein the space is an interior space.

12. The method of heating a space according to claim 1, wherein the space is the atmosphere.

13. The method of heating a space according to claim 1, wherein the system is incorporated in a vehicle and the step of heating the liquid refrigerant in a third heat exchanger includes initially applying electrical power to the heat exchanger and then applying waste heat from the engine when the temperature of the engine is sufficiently high.

14. A method of heating a space, comprising:
    circulating refrigerant in a closed loop system including a first heat exchanger and a second heat exchanger, the circulating step including
    pressurizing liquid refrigerant to a first pressure;
    heating the liquid refrigerant in a third heat exchanger to form a refrigerant vapor;
    compressing refrigerant by a compressor to a second pressure, wherein the compressor is at least partially driven by refrigerant vapor received from the third heat exchanger;
    supplying one of the first and second heat exchangers with refrigerant from the compressor;
    supplying refrigerant from the other of the first and second heat exchangers to the compressor; and
    selectively supercharging the refrigerant supplied to the compressor from said other of the first and second heat exchangers.

15. The method of heating a space according to claim 14, wherein the step of selectively supercharging the refrigerant includes a supercharger that is controlled at least in part by a refrigerant pressure in the system at a location between the compressor and the supercharger.

16. The method of heating a space according to claim 15, further comprising the step of disabling the supercharger during low heat transfer requirements.

17. The method of heating a space according to claim 14, further comprising switching modes of operation of the system, wherein in a first mode of operation the first heat exchanger receives refrigerant from the compressor and in the second mode the second heat exchanger receives refrigerant from the compressor.

18. The method of heating a space according to claim 17, wherein the system includes a controllable valve adapted to alternate the operation of the system between the first mode and the second mode.

19. The method of heating a space according to claim 14, further comprising supplying waste heat to the third heat exchanger to heat the liquid refrigerant.

20. The method of heating a space according to claim 19, wherein the compressor includes a drive chamber, a compression chamber, and a suction chamber, wherein the drive chamber receives refrigerant vapor from the third heat exchanger, the compression chamber supplies refrigerant to one of the first and second heat exchangers and the suction chamber receives refrigerant from the other of the first and second heat exchanger.

21. The method of heating a space according to claim 20, wherein the drive chamber is a first drive chamber and the compressor further includes a second drive chamber, the second drive chamber receives refrigerant vapor from the third heat exchanger upon actuation of a controllable switching valve.

22. The method of heating a space according to claim 14, wherein the step of pressurizing liquid refrigerant to a first pressure includes pressurizing the liquid refrigerant with an electric motor driven pump.

23. The method of heating a space according to claim 14, wherein the space is an interior space.

24. The method of heating a space according to claim 14, wherein the space is the atmosphere.

25. The method of heating a space according to claim 14, wherein the system is incorporated in a vehicle and the step of heating the liquid refrigerant in a third heat exchanger includes initially applying electrical power to the heat exchanger and then applying waste heat from the engine when the temperature of the engine is sufficiently high.

26. A heat pump system, comprising:
a closed loop circuit including
a liquid pump,
a first heat exchanger located downstream of the liquid pump;
a refrigerant compressor driven by refrigerant flowing from the liquid pump through the first heat exchanger;
a second heat exchanger fluidly coupled to the refrigerant compressor;
a third heat exchanger fluidly coupled to the refrigerant compressor, the second heat exchanger receiving refrigerant from the refrigerant compressor and the third heat exchanger receiving refrigerant from the second heat exchanger and supplying refrigerant to the refrigerant compressor; and
a supercharger located between the third heat exchanger and the refrigerant compressor.

27. The heat pump system according to claim 26, further including a pressure switch for detecting a refrigerant pressure of refrigerant located between the supercharger and the refrigerant compressor.

28. The heat pump system according to claim 26, further including a controllable heating/cooling valve configured to alternate between a first mode of operation wherein the refrigerant compressor supplies the second heat exchanger with refrigerant and a second mode where the refrigerant compressor supplies the third heat exchanger with refrigerant.

29. The heat pump system according to claim 26, wherein the refrigerant compressor includes a reciprocating piston member separating a drive chamber and a compression chamber, wherein the drive chamber receives refrigerant vapor from the third heat exchanger and the compression chamber supplies refrigerant to the first heat exchanger.

30. The heat pump system according to claim 29, wherein the refrigerant compressor further includes a suction chamber, the suction chamber receiving refrigerant from the second heat exchanger.

31. The heat pump system according to claim 30, wherein the drive chamber is a first drive chamber and the compressor further includes a second drive chamber, the second drive chamber receiving refrigerant vapor from the third heat exchanger upon actuation of a controllable switching valve.

32. The heat pump system according to claim 26, wherein the liquid pump includes a electric motor driven pump.

* * * * *

UNITED STATES PATENT AND TRADEMARK OFFICE
CERTIFICATE OF CORRECTION

PATENT NO. : 6,915,656 B2
DATED : July 12, 2005
INVENTOR(S) : Frank W. Ratliff

It is certified that error appears in the above-identified patent and that said Letters Patent is hereby corrected as shown below:

Column 9,
Line 48, replace "superchargers" with -- supercharger --;
Line 50, replace "compressing" with -- comprising --; and Column 11,
Line 6, replace "exchanger" with -- exchangers --.

Signed and Sealed this

Thirteenth Day of September, 2005

JON W. DUDAS
*Director of the United States Patent and Trademark Office*